United States Patent [19]
Schwertfeger et al.

[11] Patent Number: 5,474,260
[45] Date of Patent: Dec. 12, 1995

[54] AIRCRAFT CONSTRUCTION INCLUDING A PASSENGER COMFORT FACILITY

[75] Inventors: Guenter Schwertfeger, Tournefeuille, France; Harry Kwik, Hamburg, Germany; Ralf Myska, Hamburg, Germany; Hans-Juergen Mueller, Henstedt-Ulzburg, Germany; Ingrid Kutzner, Hamburg, Germany; Ralf Schliwa, Hamburg, Germany; Joachim Claus, Cornebarrieu, France; Markus Schumacher, Buxtehude, Germany; Michael Lau, Dollern, Germany; Andrew Muin, Guderhandviertel, Germany

[73] Assignee: Deutsche Aerospace Airbus GmbH, Hamburg, Germany

[21] Appl. No.: 183,995

[22] Filed: Jan. 18, 1994

[30] Foreign Application Priority Data

Jan. 15, 1993 [DE] Germany .......................... 43 00 877.1

[51] Int. Cl.⁶ .............................. B64D 11/02; B64C 1/00
[52] U.S. Cl. ........................................................ 244/118.5
[58] Field of Search ............................. 244/118.5, 118.6

[56] References Cited

U.S. PATENT DOCUMENTS

Re. 32,176  6/1986  Vernon ................. 244/118.5
2,761,637  9/1956  Brumby et al. ....... 244/118.5
4,645,145  2/1987  Alie ....................... 244/118.5

FOREIGN PATENT DOCUMENTS 161389   7/1953  Australia ............. 244/118.5
1473111  3/1967  France ................. 244/118.6
3007733  9/1981  Germany ............. 244/118.5

OTHER PUBLICATIONS

Aero Digest, *Post-War Versions of the "Mars"*, May 1944, p. 108.
Aviation Week and Space Technology, Feb. 1963, pp. 38 and 39.

Primary Examiner—William Grant
Attorney, Agent, or Firm—W. G. Fasse; W. F. Fasse

[57] ABSTRACT

An aircraft body or fuselage is divided by a main deck (3) to form an upper deck and a lower deck. The lower deck has its own floor (5). A connecting device or several such devices, for example stairs and/or elevators, interconnect the upper deck with the lower deck in positions to facilitate central access to a plurality of lower deck facilities. Supply facilities and sanitary facilities are arranged on the lower deck to provide additional seating space on the upper deck. The lower deck may also hold resting areas, such as a lounge that may be equipped with beds, such as convertible beds. A food distribution station is arranged on the upper deck in vertical alignment with a galley on the lower deck. All the facilities of a group of facilities on the lower deck are centrally accessible.

16 Claims, 4 Drawing Sheets

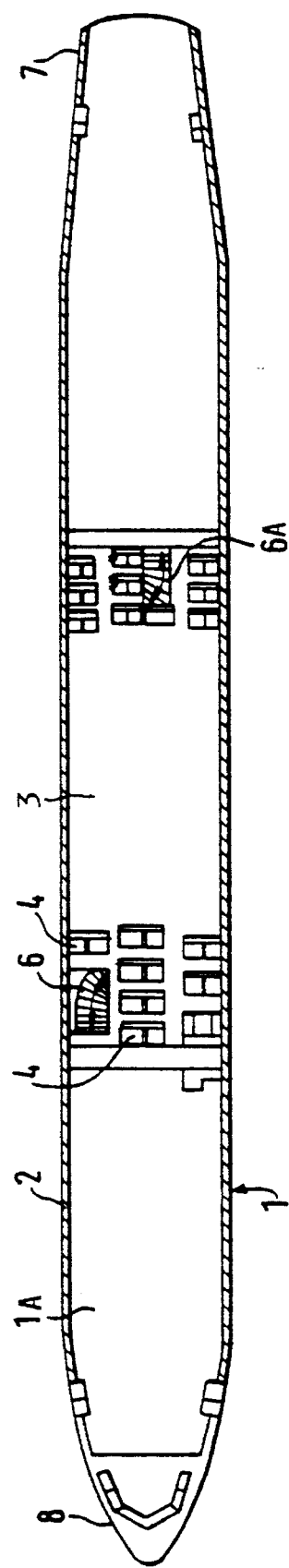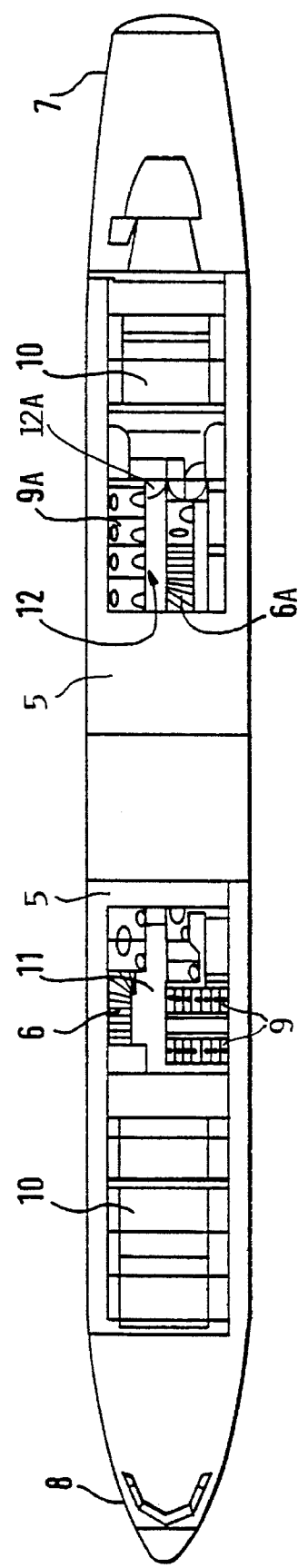

AIRCRAFT CONSTRUCTION INCLUDING A PASSENGER COMFORT FACILITY

FIELD OF THE INVENTION

The invention relates to the construction of an aircraft, particularly passenger aircraft including supply facilities and sanitary facilities. At least some of these facilities are arranged in separate service compartments within the passenger cabin.

BACKGROUND INFORMATION

Supply facilities, such as onboard kitchens, including food storage spaces and sanitary facilities, such as toilets, are conventionally installed on the same deck within an aircraft. The same deck carries passenger seats to be used by passengers during flight. Such a deck is referred to as the main deck, a so-called underfloor deck may be arranged below the main deck. The underfloor deck serves exclusively for the storage of luggage and for the installation of auxiliary equipment needed for operating the aircraft. The conventional arrangement of supply facilities on the main deck unavoidably reduces the number of passenger seats. Another drawback of arranging the above mentioned facilities on the main deck is seen in that these facilities, although needed, may impair the comfort of the passengers, for example, when a passenger has to wait because a toilet is occupied, or when a line of waiting passengers interferes with the free movement of passengers. Such impairments contribute to the discomfort of passengers.

It is known from U.S. Pat. No. 4,022,404 (Greiss), issued on May 10, 1977 to arrange a main galley on the upper deck of a three deck aircraft and to connect the middle passenger deck with the upper deck by a spiral staircase. Additionally, one or more cart lifts interconnect the upper deck galley with the passenger middle deck for transporting food supplies to the passenger middle deck.

U.S. Pat. No. 3,517,899 (Vernon) discloses arranging all or a portion of the galley in the lower cargo deck. However, such an arrangement, in the view of those skilled in this art, undesirably reduces the available space for cargo on the lower or cargo deck. These considerations are guided by maximizing investment returns without regard to passenger comfort.

OBJECTS OF THE INVENTION

In view of the foregoing it is the aim of the invention to achieve the following objects singly or in combination:

to improve a passenger aircraft construction in such a way that the space available on the main deck is increased for the comfort of the passengers without increasing the size of the aircraft;

to arrange toilets or handwash basins in such a way that the inward curvature of the fuselage on the upper deck does not interfere with the comfort of the user;

to install supply and sanitary facilities on the lower deck so as to increase the available space on the upper deck for seating arrangements or the like; and to take advantage of the fact that the inner fuselage wall curves inwardly, relative to a central vertical plane of the fuselage, on the main deck and outwardly on the lower deck.

SUMMARY OF THE INVENTION

An aircraft construction according to the invention is characterized in that at least one passenger comfort facility such as a supply facility and/or a service facility and/or a sanitary facility in a service compartment is arranged on the lower deck below the main deck that separates the passenger cabin from the lower deck facilities, and in that the main deck and the lower deck are interconnected in the area of the service compartment by a connecting device capable of permitting a person to move from one deck to the other and permitting direct access by the person to any of the facilities in the service compartment on the lower deck.

By shifting the service compartment with its facility or facilities from the main deck to the lower deck the invention achieves the advantage that the utilization of the upper deck for the comfort of the passengers and crew is substantially less restricted. Further, from an economic point of view it is now possible to install a larger number of passenger seats on the upper deck, whereby returns on the investment may be improved even though some cargo space is lost.

Another advantage is seen in that the arrangement of user facilities, such as onboard galleys or bathrooms, can now be arranged in a more user-friendly manner by taking advantage of the fact that the fuselage wall curves outwardly and upwardly below the main deck and inwardly above the main deck relative to a central vertical plane through the fuselage. This inward curvature of the fuselage wall above the main deck posed a problem heretofore, because standing, for example, in front of a handwash basin facing the inwardly curving wall of the fuselage brought the wall close to the head of the user, sometimes too close. Heretofore, this fact of the inwardly curving fuselage wall in the passenger compartment imposed substantial restrictions on the freedom of arranging facility components with due regard to the convenience of the user while simultaneously efficiently using the available space. The invention avoids these problems by arranging especially toilet facilities on the lower deck.

Further space is gained on the upper deck or main deck by arranging at least one onboard kitchen on the lower deck. Additional comfort features for passengers and crew are achieved by providing sleeping facilities and/or other recreational facilities on the lower deck.

The connecting device between the upper and lower deck is preferably a stair, but it could be an elevator instead, or an elevator could be provided in addition to the stairs. A stair uses spaces and especially the available surface area efficiently, if the stair is constructed as a spiral stair that provides at least one 90° turn.

Another improvement in passenger comfort is achieved according to the invention by providing a waiting area or powder room next to toilet facilities so as to avoid passenger lines waiting in front of an occupied toilet.

BRIEF DESCRIPTION OF THE DRAWINGS

In order that the invention may be clearly understood, it will now be described, by way of example, with reference to the accompanying drawings, wherein:

FIG. 1 shows a horizontal section through a passenger aircraft, whereby the section plane extends through the upper deck above the floor of the upper or main deck;

FIG. 2 is a horizontal section through the lower deck above the lower deck floor;

Figure 3:
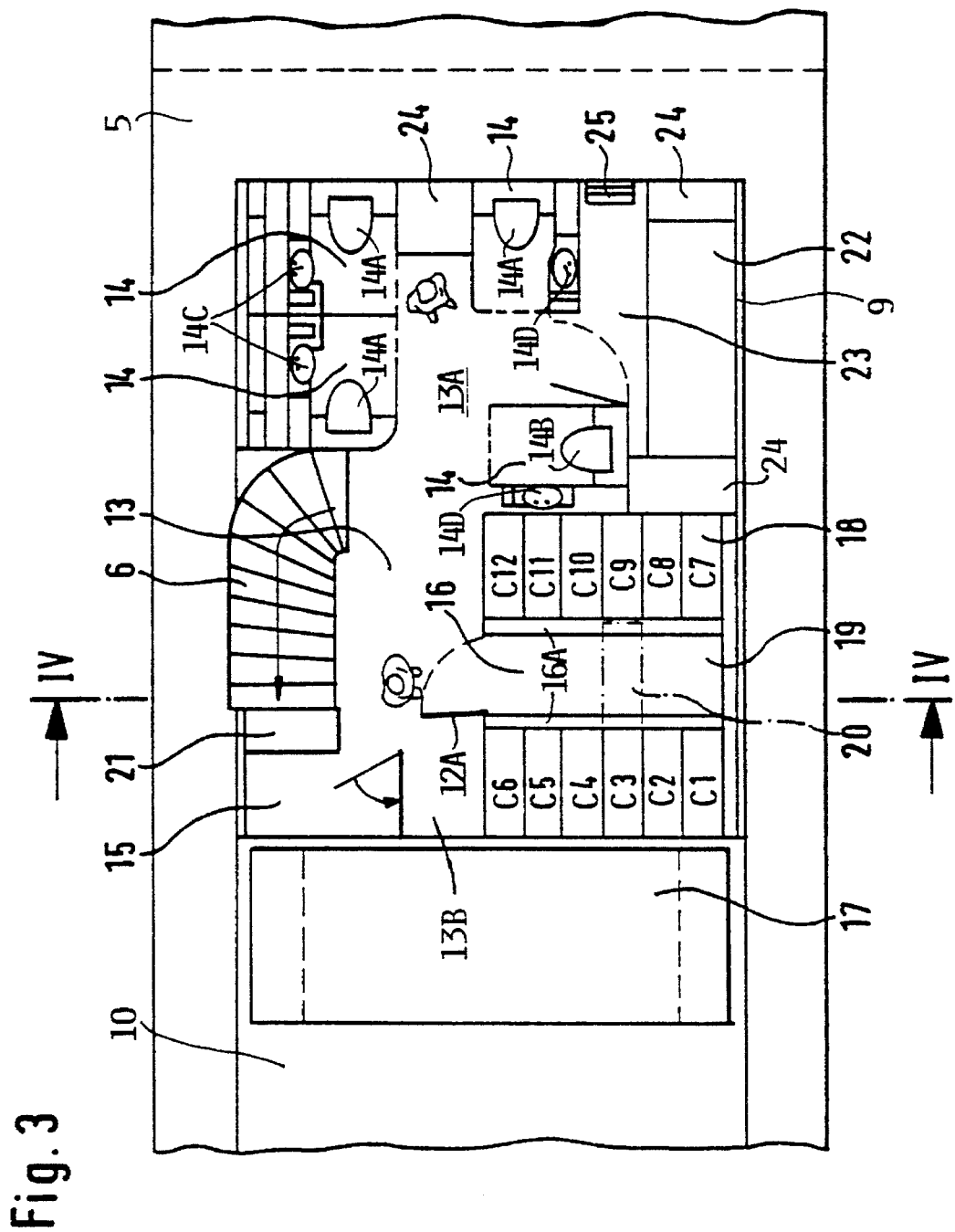
FIG. 3 illustrates, on an enlarged scale compared to FIG.
Figure 4:
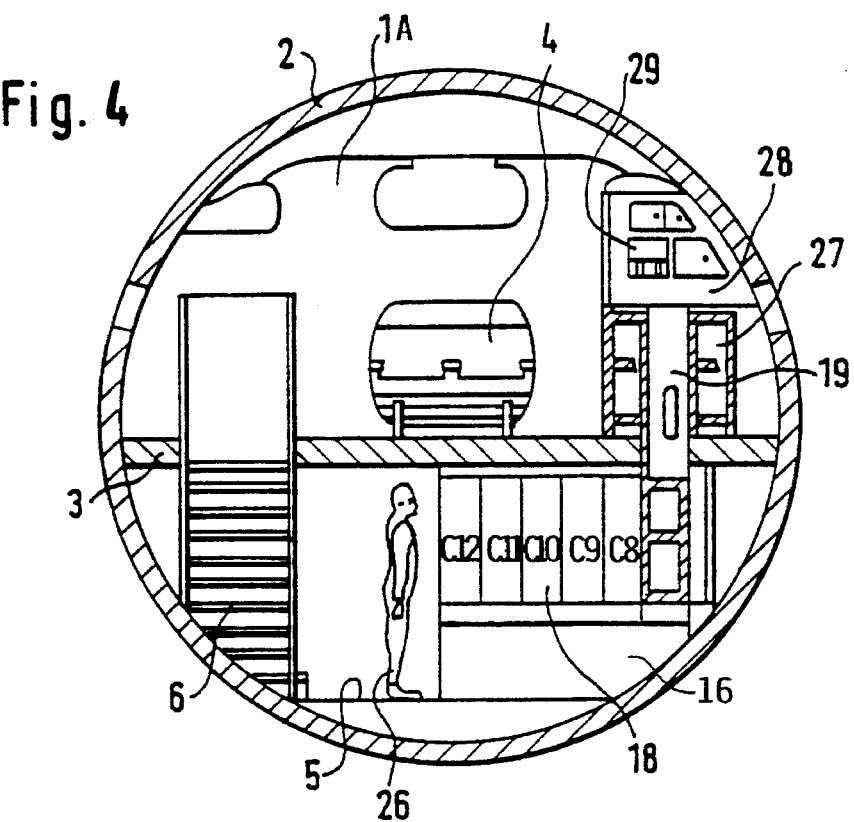
Figure 6:
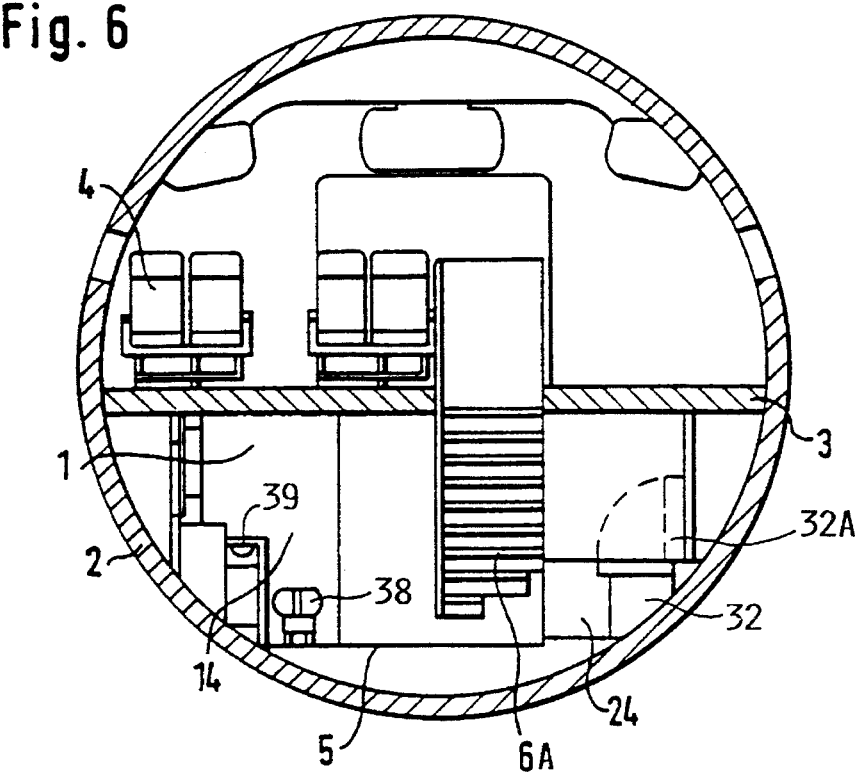
Figure 5:
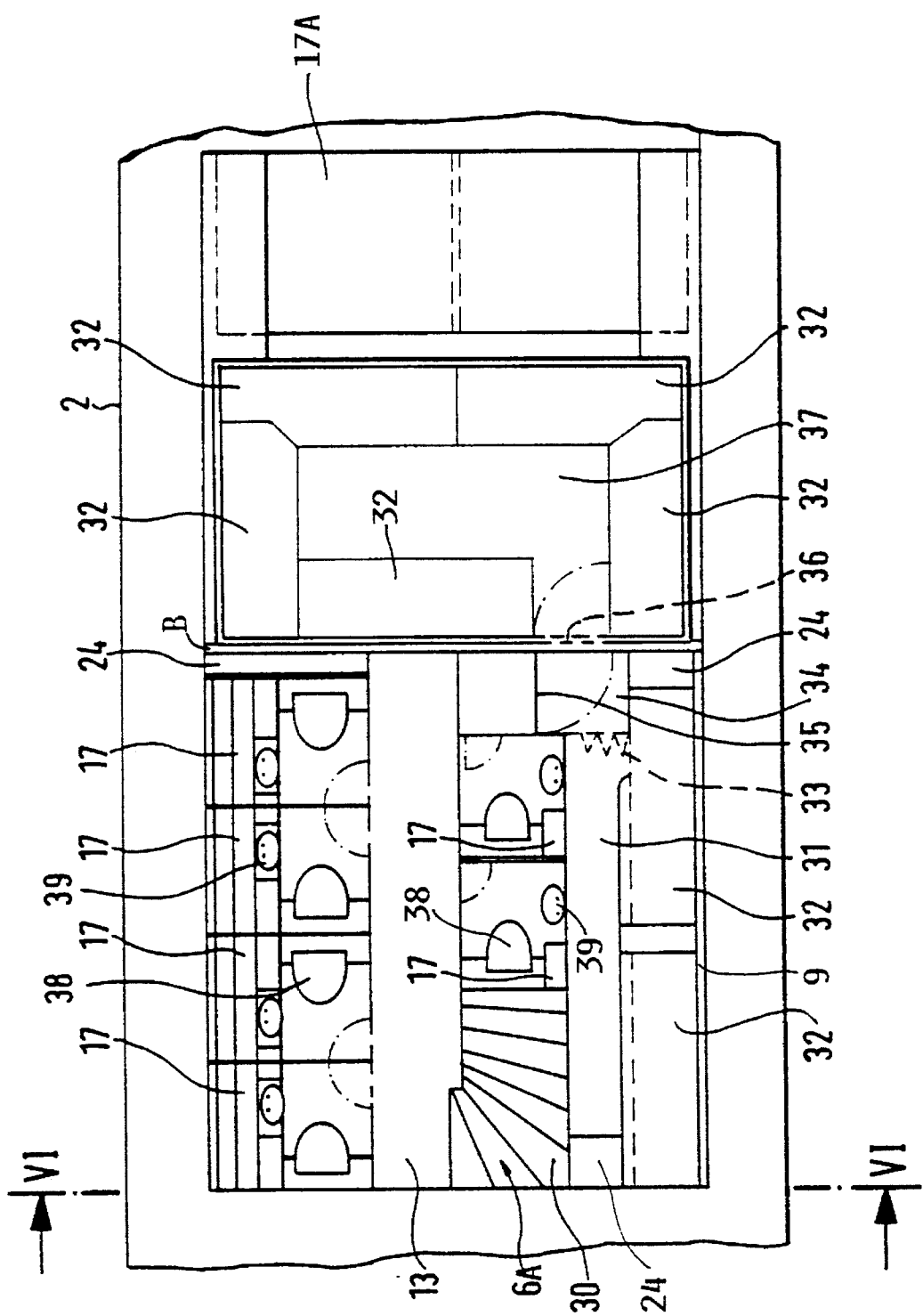

2, a floor plan near the forward end of the lower deck of the aircraft;

FIG. 4 is a sectional view along section plane IV—IV in FIG. 3;

FIG. 5 illustrates, on an enlarged scale, a floor plan on the lower deck near the tail end of the aircraft; and FIG. 6 is a sectional view in the section plane VI—VI in FIG. 5.

DETAILED DESCRIPTION OF PREFERRED EXAMPLE EMBODIMENTS AND OF THE BEST MODE OF THE INVENTION

FIGS. 1 and 2 show an aircraft body 1 with a cabin space 1A enclosed by the fuselage wall 2. The fuselage or cabin space is divided by a main deck 3 to form an upper passenger cabin space and a lower space having its own floor 5. Passenger seats 4 are arranged in the upper cabin space. The lower space and the upper space are connected by two connecting devices 6 and 6A shown, for example, in the form of stairs positioned for central access to all lower deck facilities. The stairs 6 are arranged closer to the forward end 8 of the aircraft, while the stairs 6A are arranged closer to the tail end 7 of the aircraft. Central access here means that access to one facility does not require passage through another facility.

In the plan view of the lower floor or deck 5, shown in FIG. 2, a compartment including supply or service facilities 9 and/or sanitary facilities 9A is positioned next to cargo holds 10. Preferably, the supply and sanitary facilities are arranged next to hallways 11 and 12 that are preferably provided with doors 12A.

Referring to FIG. 3, the plan view of the facilities on the lower deck 5 closer to the forward end 8 of the aircraft the stairs 6 form part of a spiral stairs with a 90° turn. A waiting area 13 is provided next to the stairs 6. This waiting area extends into hallways 13A and 13B. A plurality of toilets 14 are arranged around the hallway 13A with easy access from the central waiting area 13. Toilet bowls 14A are so arranged that their backs extend crosswise to the longitudinal axis of the aircraft, thereby avoiding the problem of an inwardly curving fuselage wall that comes close to the head of a user facing toward the toilet. A toilet bowl 14B arranged with its back edge in parallel to the longitudinal or centerline of the plane also avoids the above mentioned problem, because the position of the toilet is sufficiently far away from the fuselage wall. Handwash basins 14C are so arranged that the fuselage wall curves downwardly toward the feet of the user and upwardly away from the user so that the space above the handwash basin 14C is unobstructed. Similar considerations apply to handwash basins 14D because they are arranged far enough away from the fuselage wall.

FIG. 3 also shows that the longer section of the stairs 6 extends substantially in parallel to the fuselage side wall, whereby the curvature of the fuselage side wall below the main or upper deck disappears below and behind the stairs. This feature provides a very efficient use of the available space, because the lower end of the above mentioned spiral stair with its at least one 90° turn can follow the curvature of the inner side wall of the fuselage as shown in FIG. 4. Further, the position of the spiral stair next to the curvature of the fuselage side wall provides substantially more freedom in the arrangement of the passenger seats 4 on the upper deck 3. A telephone booth 15 which may hold more than one telephone, and a galley 16 holding a total of twelve supply carts C1 to C12 are also arranged on the lower floor with easy access from the waiting area 13 and hallways 13B. A garbage collecting bin 17 is also accessible through the central hallway 13B.

The galley 16 is preferably equipped with an elevator 19 for transporting serving carts C1 to C12 to the upper deck. In order to shift any one of the transport carts into the elevator 19, a shifting trolley 20 is movable back and forth in the galley 16, preferably on tracks 16A. A supply unit 21 is positioned between the stairs 6 and the telephone booth 15.

A sick bay 23 is equipped with a sick bed 22, a folding chair 25, and storage cabinets 24.

Referring to FIG. 4, the lower deck or floor 5 is vertically positioned below the main deck 3 by a vertical clearance or spacing just slightly longer than the height of an average person 26. Garbage carts 27 corresponding in size to the supply carts 18 are so arranged that they can also be transported by the elevator 19 from the upper deck 3 to the lower deck 5 for positioning in the garbage bin 17. The elevator 19 communicates the galley 16 on the lower deck 5 with the upper deck. Preferably, the upper exit end of the elevator 19 is so positioned that its upper exit communicates with a distribution station 28 on the upper deck. The distribution station 28 is equipped for loading or unloading the elevator 19. Additionally, the distribution station 28 is equipped with faucets for hot and cold water or with other supply features for convenience articles for use by the passengers and crew. Hot water heaters are preferably also installed in the distribution station 28. By positioning the distribution station 28 on the upper deck 3 in vertical alignment with the galley 16 on the lower deck, the required distances to be traversed by the flight attendants, for example when distributing a meal, are held to a minimum.

FIG. 5 illustrates the arrangement of a plurality of toilets with toilet bowls 38 and handwash basins 39 arranged according to the invention, namely so that the back edge of each toilet bowl extends horizontally and perpendicularly to the longitudinal axis, or central longitudinal plane of the fuselage and so that the handwash basins 39 face the fuselage wall or another central wall on the lower deck of the aircraft. This arrangement of the sanitary facilities avoids the problem that the fuselage wall curves toward the user. Rather, the fuselage wall curves upwardly away from the user as seen in the lower left-hand quadrant in FIG. 6.

FIG. 5 also shows the stairs 6A with a 90° turn, thereby providing at least a partial spiral arrangement of the treads 30 which become wider at the radially outward end of the tread to thereby provide space for two persons to pass each other. The toilet facilities are also equipped with garbage collecting bins 17 as shown in FIG. 5.

FIG. 5 further shows the arrangement of a bedroom 31 with two beds 32 accessible through a folding door 33 and through a hall passage 34 provided with its door 35. The bulkhead B is provided with a passage 36 leading into a room 37 that may be used either as a lounge or as a bedroom, whereby the beds 32 are preferably of the convertible type. If desired, the beds or some of these beds 32 may be constructed as bunkbeds. A luggage or garbage container 17A is positioned between the lounge 37 and the tail end of the aircraft body.

FIG. 6 illustrates a sectional view through one of the toilets shown in FIG. 5, whereby it becomes clear that the outward curvature of the lower section 2 of the aircraft body does not interfere with the positioning of the handwash basin 39 nor with the positioning of the toilet bowl 38. As shown, a substantial head space is realized for the user of these facilities 38, 39. FIG. 6 further shows that the beds 32 may be of the type in which the mattress 32A can be tilted into an upright position as shown in dashed lines. The stairs 6A are shown with the lower portion removed, since the lower portion extends in front of the section plane which corresponds to the sheet of the drawing.

The stairs 6 and 6A are preferably arranged off-center as shown in FIGS. 4 and 6 relative to the above mentioned central vertical plane through the aircraft body so that the stairs hardly interfere at all with the positioning of the seating structures 4. Thus, any retooling operations that may be necessitated by the installation of the stairs, according to the invention, are minimized. Preferably, the stairs are positioned close to the fuselage wall as shown in FIGS. 3 and 4 for a very efficient use of space.

Conventional light indicators may be used to indicate whether a toilet is occupied or not.

Remaining spaces on the lower deck or intermediate spaces on the lower deck between the facilities shown in FIGS. 3 and 5 may hold luggage and/or cargo. Thus, a very efficient space utilization is accomplished according to the invention while still optimizing passenger comfort.

Although the invention has been described with reference to specific example embodiments, it will be appreciated, that it is intended to cover all modifications and equivalents within the scope of the appended claims.

What we claim is:

1. An aircraft construction, comprising a fuselage, a main deck (3) dividing said fuselage into an upper passenger cabin and a lower space having its own lower deck (5), at least one cargo hold (10) and at least one service compartment (9) permanently installed next to said cargo hold (10) on said lower deck, said service compartment on said lower deck comprising at least one passenger comfort facility, and at least one spiral stair leading from said main deck into said service compartment through said main deck for movement by a person from one deck to the other and for direct access to any one of said facilities by said person, and wherein said passenger comfort facility comprises on said lower deck a sanitary facility comprising at least one toilet including a toilet bowl (14A, 38) having a back edge extending perpendicularly to a central longitudinal vertical plane of said aircraft fuselage, and a hand wash basin (14C, 39) arranged so that a user faces toward an inner fuselage wall that curves upwardly away from the user.

2. The aircraft construction of claim 1, wherein said passenger comfort facility is constructed as at least one of a toilet facility, a service facility, a supply facility, and sleeping facility.

3. The aircraft construction of claim 1, wherein said passenger comfort facility is constructed as an onboard galley.

4. The aircraft construction of claim 1, wherein said passenger comfort facility is constructed as sleeping quarters.

5. The aircraft construction of claim 1, wherein said passenger comfort facility is constructed as a lounge.

6. The aircraft construction of claim 1, wherein said spiral stair has treads arranged so that lower treads follow a helix and a movement direction changes by about 90° between said decks.

7. The aircraft construction of claim 1, wherein said service compartment comprises a waiting area.

8. The aircraft construction of claim 1, comprising a vertical spacing between said main deck (3) and said lower deck (5), said vertical spacing being sufficient to accommodate an upright standing human.

9. The aircraft construction of claim 1, wherein said spiral stair (6) is arranged laterally close to an inner surface of an outer fuselage wall.

10. The aircraft construction of claim 1, wherein said service compartment comprises at least one stowage space.

11. The aircraft construction of claim 1, further comprising a distribution station (28) on said main deck, said spiral stair connecting said service compartment on said lower deck with said distribution station on said main deck.

12. The aircraft construction of claim 11, further comprising an elevator or lift (19) positioned in said distribution station and reaching into said service compartment.

13. The aircraft construction of claim 1, further comprising a waste collecting container (17) on said lower deck, said waste collecting container comprising a waste treatment facility.

14. The aircraft construction of claim 13, wherein said waste collecting container is directly accessible from said service compartment next to said cargo hold.

15. An aircraft construction, comprising a fuselage, a main deck (3) dividing said fuselage into an upper passenger cabin and a lower space having its own lower deck (5), at least one cargo hold (10) and at least one service compartment (9) permanently installed next to said cargo hold (10) on said lower deck, said service compartment on said lower deck comprising at least one passenger comfort facility, and at least one spiral stair leading from said main deck into said service compartment through said main deck for movement by a person from one deck to the other and for direct access to any one of said facilities by said person, wherein said passenger comfort facility comprises on said lower deck a toilet with a toilet bowl oriented in parallel to a longitudinal aircraft axis so that a user faces in a direction of said longitudinal aircraft axis, and a hand wash basin oriented so that a user faces toward an outer fuselage wall that curves upwardly away from the user.

16. An aircraft construction comprising a fuselage, a main deck (3) dividing said fuselage into an upper passenger cabin and a lower space having its own lower deck (5), at least one cargo hold (10) and at least one service compartment (9) permanently installed next to said cargo hold (10) on said lower deck, said service compartment comprising at least one passenger comfort facility, and at least one spiral stair leading from said main deck into said service compartment through said main deck for movement by a person from one deck to the other and for direct access to any one of said facilities, and wherein said spiral stair is arranged laterally close to a curvature of an inner surface of a fuselage wall so that lower treads of said spiral stair follow said curvature of said inner surface of said fuselage wall, wherein said spiral stair has at least one 90° turn near its lower stair end, said curvature accommodating said 90° turn, wherein said passenger comfort facility comprises a hand wash basin arranged so that said curvature curves upwardly away from a user of said hand wash basin and a toilet bowl oriented in parallel to a longitudinal aircraft axis so that a user of said toilet bowl faces in a direction of said longitudinal aircraft axis.

\* \* \* \* \*